US008764096B2

(12) United States Patent
Han et al.

(10) Patent No.: US 8,764,096 B2
(45) Date of Patent: Jul. 1, 2014

(54) BUMPER ASSEMBLY FOR VEHICLE

(71) Applicants: Hyundai Motor Company, Seoul (KR); Kia Motors Corporation, Seoul (KR)

(72) Inventors: Min Uke Han, Gwangmyung-si (KR); Chang Ho Park, Suwon-si (KR); Hae Woong Kim, Seoul (KR); Jun Hyoung Kim, Seongnam-si (KR); Soo Heung Eom, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/709,789

(22) Filed: Dec. 10, 2012

(65) Prior Publication Data
US 2014/0008923 A1  Jan. 9, 2014

(30) Foreign Application Priority Data

Jul. 3, 2012 (KR) ........................ 10-2012-0072438

(51) Int. Cl.
*B60R 19/34* (2006.01)
(52) U.S. Cl.
USPC ..................................... 296/133; 296/187.09
(58) Field of Classification Search
USPC ............ 296/187.09, 187.03, 203.02, 203.03; 293/132–135
IPC ....................................................... B60R 19/34
See application file for complete search history.

(56) References Cited

U.S. PATENT DOCUMENTS

| 6,857,690 | B2 | 2/2005 | Vismara |
| 7,000,975 | B2 | 2/2006 | Haneda et al. |
| 7,469,956 | B2 * | 12/2008 | Yasuhara et al. ......... 296/187.09 |
| 8,056,926 | B2 * | 11/2011 | Okabe et al. .................. 280/784 |
| 8,172,286 | B2 | 5/2012 | Klimek |
| 8,256,831 | B2 * | 9/2012 | Abe et al. ................. 296/203.02 |
| 8,608,231 | B1 | 12/2013 | Mendivil et al. |
| 2007/0176443 | A1 | 8/2007 | Yasuhara et al. |
| 2010/0127531 | A1 | 5/2010 | Yasuhara et al. |
| 2011/0193370 | A1 | 8/2011 | Klimek |
| 2011/0309606 | A1 | 12/2011 | Klimek |
| 2012/0007373 | A1 * | 1/2012 | Boettcher et al. ............. 293/132 |
| 2012/0086225 | A1 | 4/2012 | Matsuura et al. |
| 2012/0104777 | A1 | 5/2012 | Ghannam et al. |
| 2012/0248820 | A1 | 10/2012 | Yasui et al. |

(Continued)

FOREIGN PATENT DOCUMENTS

| JP | 2005-178547 A | 7/2005 |
| JP | 2009-137435 A | 6/2009 |
| KR | 20-0161595 | 1/2000 |
| KR | 10-1034790 B1 | 5/2011 |

*Primary Examiner* — Pinel Romain
(74) *Attorney, Agent, or Firm* — Morgan, Lewis & Bockius LLP

(57) ABSTRACT

A bumper assembly for vehicle may include a first side member disposed in each of both sides of a vehicle body in a longitudinal direction thereof, a second side member coupled to an external surface of the first side member, a fender member having one side coupled to an external side of the second side member, a member flange connected to front ends of the first and second side members respectively, a mounting flange coupled with the member flange, a first crash box having a rear end connected to the mounting flange, a second crash box having a rear end connected to the mounting flange, and a bumper beam having both distal sides, each of which may be coupled to front ends of the first and second crash boxes.

12 Claims, 8 Drawing Sheets

(56) References Cited

U.S. PATENT DOCUMENTS

| | | |
|---|---|---|
| 2012/0313398 A1 | 12/2012 | Shin et al. |
| 2013/0069377 A1 | 3/2013 | Qu et al. |
| 2014/0091585 A1 | 4/2014 | Ramoutar et al. |

* cited by examiner

BUMPER ASSEMBLY FOR VEHICLE

CROSS-REFERENCE TO RELATED APPLICATION

The present application claims priority to Korean Patent Application No. 10-2012-0072438 filed on Jul. 3, 2012, the entire contents of which is incorporated herein for all purposes by this reference.

BACKGROUND OF THE INVENTION

1. Field of the Invention

The present invention relates to a bumper assembly for vehicle, and in particular, to a vehicle bumper assembly to effectively distribute a collision energy caused by a front or side collision of a vehicle.

2. Description of Related Art

A vehicle bumper assembly typically stands for a bumper assembly formed in a front and a rear of a vehicle body. If a vehicle is collided with another vehicle or object, the vehicle bumper assembly can minimize deformation of the vehicle body and ensure the safety of passengers by absorbing a collision load.

The vehicle bumper assembly is disposed in a transverse direction from a front and rear of the vehicle and is a bumper beam mounted in a side member of the vehicle body through both sides of a crash box. The vehicle bumper assembly includes a shock absorber disposed in a front of the bumper beam to absorb the shock load. In addition, the bumper beam and the shock absorber are covered with a bumper cover.

The shock absorber is also referred to an energy absorber, and installed to be covered by the bumper cover in a state attached to the front of the bumper beam.

However, such a bumper assembly in the prior art may cause deformation of a passenger compartment in a small overlap collision of the vehicle, due to the fact that dispersion of a collision energy is insufficient through the side member and the crash box, and the bumper beam. Therefore, there is a problem in that the passenger's injury is increased in a side collision of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle bumper assembly that can minimize collision energy delivered to a vehicle body and ensure safety of passengers, in which when a front portion of the vehicle is collided in front and side directions, a collision energy caused by a collision is doubly distributed to efficiently distribute or absorb the collision energy.

In an aspect of the present invention, a bumper assembly for vehicle may include a first side member disposed in each of both sides of a vehicle body in a longitudinal direction thereof, a second side member coupled to an external surface of the first side member, a fender member having one side coupled to an external side of the second side member, a member flange connected to front ends of the first and second side members respectively, a mounting flange coupled with the member flange, a first crash box having a rear end connected to the mounting flange, a second crash box having a rear end connected to the mounting flange, and a bumper beam having both distal sides, each of which is coupled to front ends of the first and second crash boxes.

The first crash box and the second crash box are aligned with a predetermined angle.

The both distal sides of the bumper beam are bent with a radius of curvature.

The second side member is formed in a triangular shape.

The member flange may include a first mounting surface coupled with the front end of the first side member, and a second mounting surface formed to be bent from the first mounting surface to an external side of the vehicle body and coupled with the front end of the second side member.

The mounting flange may include a third mounting surface coupled with the rear end of the first crash box, and a fourth mounting surface formed to be bent to the external side of the vehicle body from the third mounting surface and coupled with the rear end of the second crash box, wherein the third mounting surface of the mounting flange is connected to the first mounting surface of the member flange, and wherein the fourth mounting surface of the mounting flange is connected to the second mounting surface of the member flange.

The mounting flange may include a third mounting surface coupled with the rear end of the first crash box, and a fourth mounting surface formed to be bent to the external side of the vehicle body from the third mounting surface and coupled with the rear end of the second crash box.

The member flange and the mounting flange are coupled by a bolting.

Another side of the fender member is coupled with a dash panel of the vehicle body.

The second crash box is coupled to the external side of the first crash box.

The second crash box is coupled in a form of surrounding the external side of the first crash box.

The second crash box is formed with a "U" shaped cross-section.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
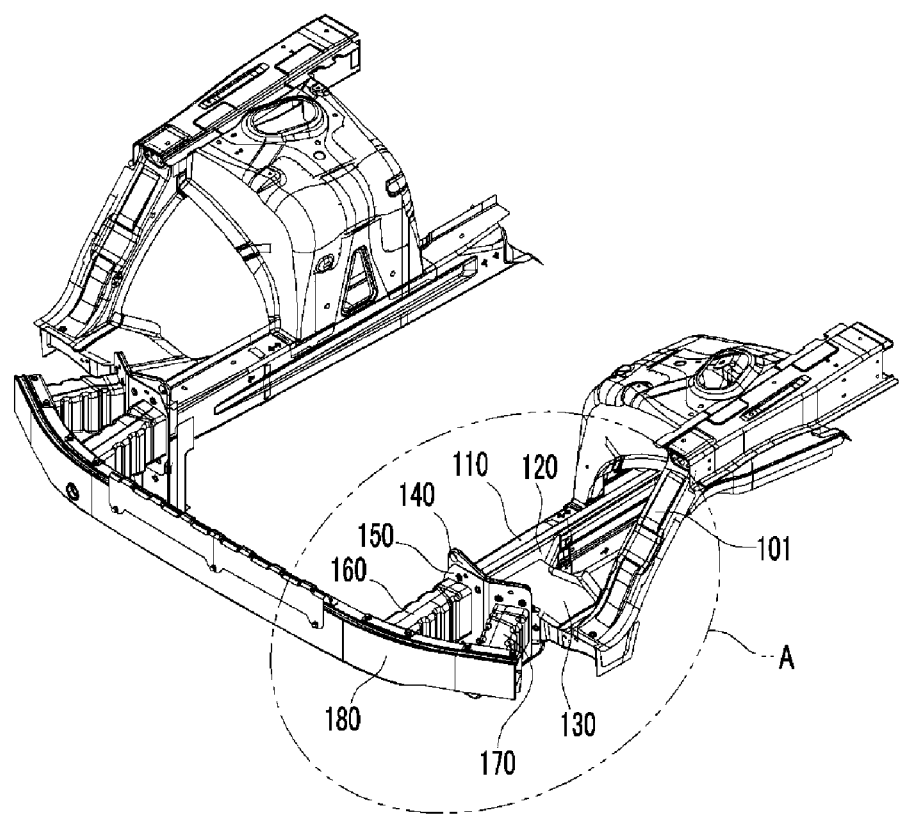
FIG. 1 is a perspective view illustrating a vehicle bumper assembly according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings, in which exemplary embodiments of the invention may be easily realized by those skilled in the art. However, the present invention may be implemented in several embodiments and is not intended to be limiting of the exemplary embodiments described herein.

In order to clearly explain an exemplary embodiment of the present invention, a portion that is not directly related to the present invention was omitted, and the same reference numerals are attached to the same or similar constituent elements through the entire specification.

In addition, since the sizes and thickness of each of constituent elements in drawings is randomly shown for the convenience of explanation, the present invention illustrated in the drawings is not limited to thereof and several portions and regions may be exaggerated for clarity.

FIG. 1 is a perspective view illustrating a vehicle bumper assembly according to a first exemplary embodiment of the present invention.

In accordance with the first exemplary embodiment of the present invention, a vehicle bumper assembly 100 includes a structure that can minimize collision energy delivered to the vehicle body and ensure safety of passengers, in which when a front portion of a vehicle is collided in front and side directions, collision energy caused by the collision is doubly distributed by efficiently distributing or absorbing the collision energy.

In addition, in accordance with the first exemplary embodiment of the present invention, the vehicle bumper assembly 100 includes a structure in which crash boxes are mounted in front and side directions from a front portion of the vehicle, respectively to minimize deformation of a side member of the vehicle body and improve the durability of the vehicle body by distributing or absorbing the collision energy.

Figure 2:
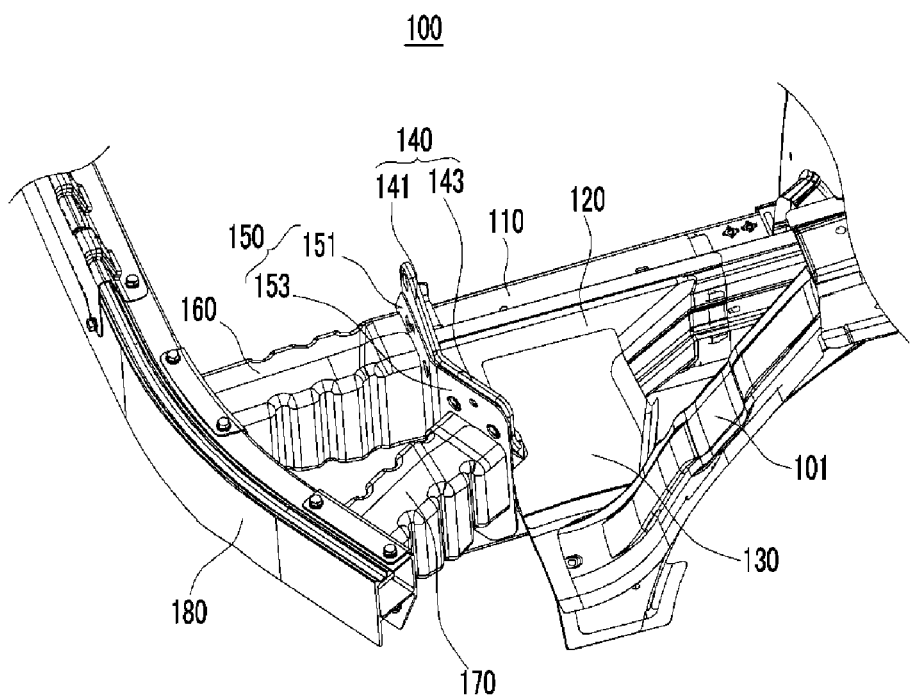
FIG. 2 is an enlarged perspective view illustrating a portion A of FIG. 1.
Figure 3:
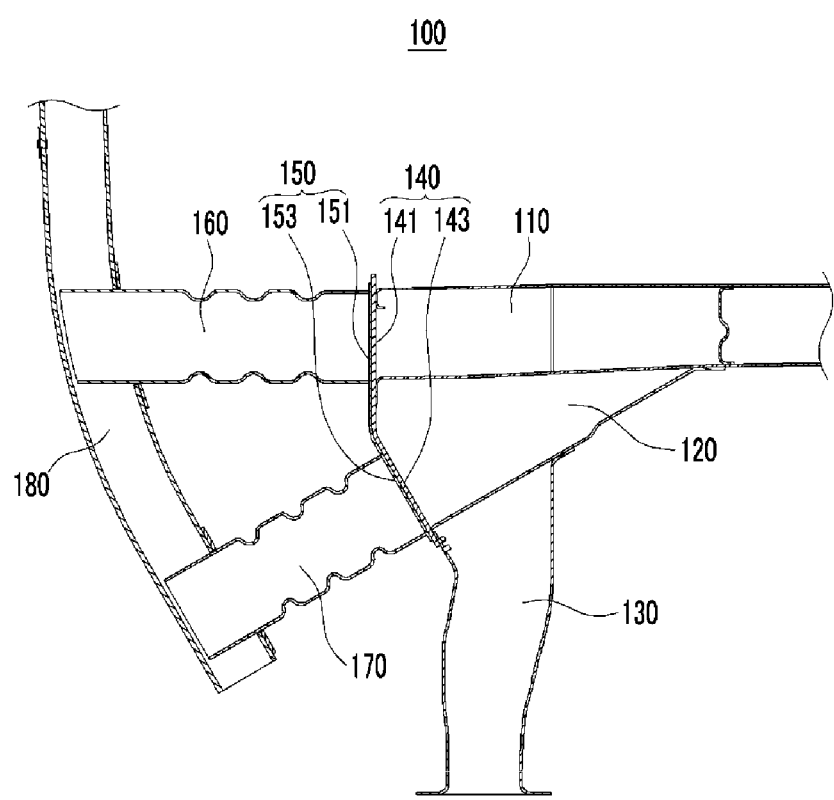
FIG. 3 is a diagram illustrating a vehicle bumper assembly according to various exemplary embodiments of the present invention.

FIG. 2 is an enlarged perspective view illustrating a portion A of FIG. 1, and FIG. 3 is a diagram illustrating a vehicle bumper assembly according to a first exemplary embodiment of the present invention.

Referring to FIG. 2 and FIG. 3, the vehicle bumper assembly 100 according to the first exemplary embodiment of the present invention includes a first side member 110, a second side member 120, a fender member 130, a member flange 140, a mounting flange 150, a first crash box 160, a second crash box 170 and a bumper beam 180.

The first side member 110 is connected with a dash panel 101 made up the vehicle body to form external sides in both sides of the front.

The second side member 120 is coupled to the external side of the first side member 110.

The second side member 120 is formed in a triangular shape. The triangular shape is a shape to facilitate that a collision energy delivered to the second side member 120 can be delivered to the first side member 110 in a side collision of the vehicle.

One side of the fender member 130 is coupled to an external side of the second side member 120 and the other side thereof is coupled with the dash panel 101 of the vehicle body.

The member flange 140 is connected to the front end of the first and second side members 110 and 120. In addition, the member flange 140 includes the first mounting surface 141 and the second mounting surface 143.

Here, the first mounting surface 141 is connected to a front end of the first side member 110, and the second mounting surface 143 is formed to be bent to an external side of the vehicle body from the first mounting surface 141 and coupled with the front end of the second side member 120.

The mounting flange 150 is formed with a shape corresponding to the member flange 140 and coupled with the member flange 140.

Here, the mounting flange 150 includes a third mounting surface 151 and a fourth mounting surface 153. In addition, the third mounting surface 151 is coupled with the first mounting surface 141 of the member flange 140. Moreover, the fourth mounting surface 153 is formed to be bent to an external side of the vehicle body from the third mounting surface 151. On the other hand, the third mounting surface 151 and the fourth mounting surface 153 are coupled with the second mounting surface 143.

The rear end of the first crash box 160 is connected with the third mounting surface 151 of the mounting flange 150.

The rear end of the second crash box 170 is connected with the fourth mounting surface 153 of the mounting flange 150.

The member flange 140 and the mounting flange 150 may be engaged by a bolting.

The both sides of the bumper beam 180 are coupled to the front ends of the first and second crash boxes 160 and 170, respectively.

Hereinafter, in accordance with the exemplary embodiment of the present invention configured as described above, the operation and effect of the vehicle bumper assembly will be described in detail.

Figure 4:
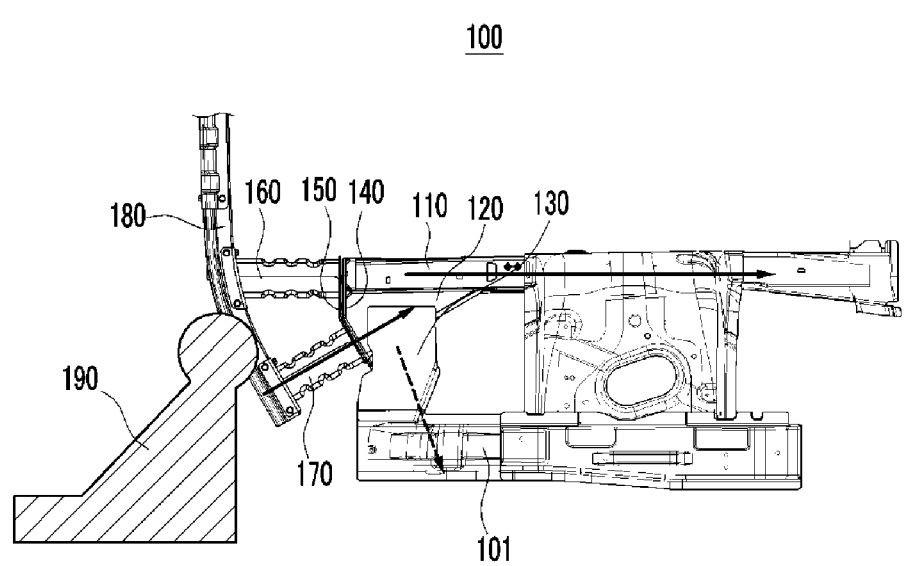
FIG. 4 is a diagram illustrating directions in which collision energy is distributed in a small overlap collision of the vehicle in accordance with various exemplary embodiments of the present invention.
Figure 5:
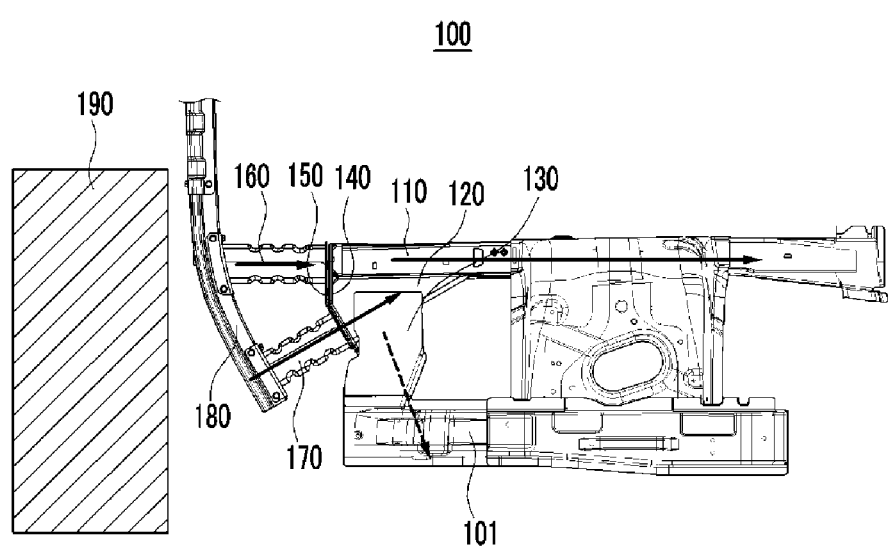
FIG. 5 is a diagram illustrating directions in which collision energy is distributed in a front collision of the vehicle in accordance with various exemplary embodiments of the present invention.

FIG. 4 is a diagram illustrating directions in which a collision energy is distributed in a small overlap collision of the vehicle in accordance with a first exemplary embodiment of the present invention, and FIG. 5 is a diagram illustrating directions in which a collision energy is distributed in a front collision of the vehicle in accordance with a first exemplary embodiment of the present invention.

Referring to FIG. 4, in the vehicle bumper assembly 100 according to the first exemplary embodiment of the present invention, when a front portion of the vehicle is collided in a side direction, the barrier 190 is not contacted with first crash box 160, and contacted with the second crash box 170. Accordingly, the second crash box 170 may absorb the collision energy.

Therefore, the second crash box 170 is deformed by the collision, and the collision energy absorbed by the second crash box 170 is delivered to the second side member 120 coupled to the external side of the first side member 110.

Here, after the collision energy is absorbed by second side member 120, the residual collision energy is delivered to the first side member 110. Accordingly, the amount of the collision energy delivered to a passenger compartment may be minimized.

Referring to FIG. 5, in the vehicle bumper assembly 100 according to the first exemplary embodiment of the present invention, when a front portion of the vehicle is collided in a front direction, the collision energy delivered from the barrier 190 is distributed and absorbed simultaneously by the first and second crash boxes 160 and 170 to increase the absorption amount of the initial collision energy, and the residual collision energy is delivered to the first side member 110. Accordingly, the amount of the collision energy delivered to the passenger compartment can be minimized.

Therefore, in accordance with the exemplary embodiment of the present invention, the vehicle bumper assembly 100 has an effect of minimizing collision energy delivered to the vehicle body and improving the safety of passengers, in which when the front portion of the vehicle is collided in front and side directions, the collision energy caused by the collision is doubly distributed and absorbed to efficiently distribute or absorb the collision energy.

In addition, since the crash boxes 160 and 170 are mounted in front and side directions from a front portion of the vehicle, respectively, the deformation of the side member of the vehicle body can be minimized and the durability of the vehicle body can be improved by distributing or absorbing the collision energy.

Figure 6:
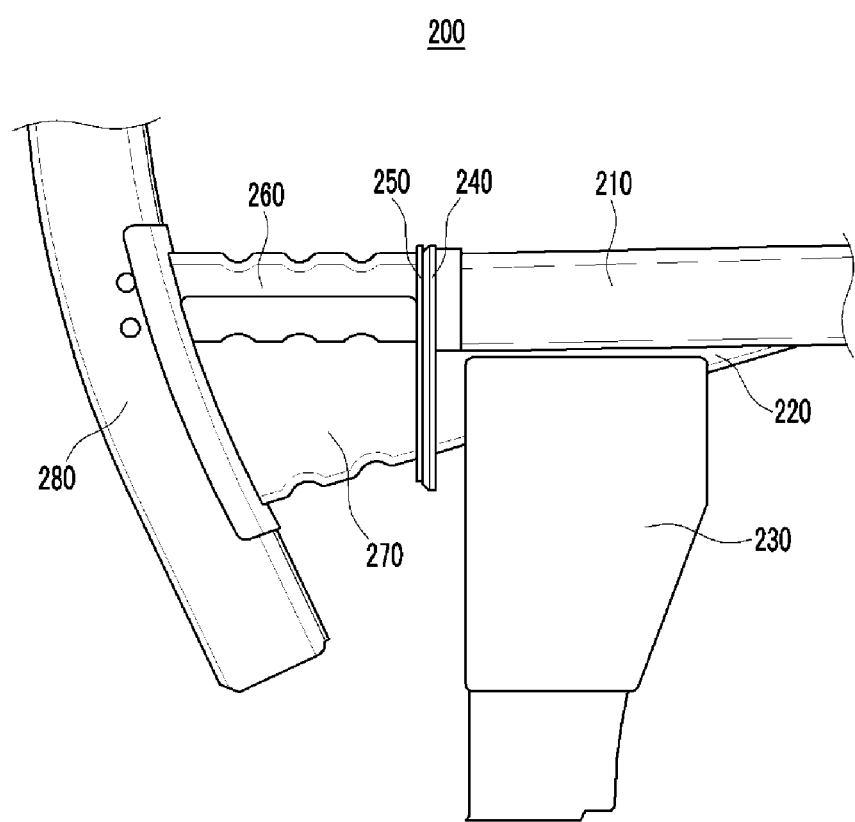
FIG. 6 is a diagram illustrating a vehicle bumper assembly according to various exemplary embodiments of the present invention.
Figure 7:
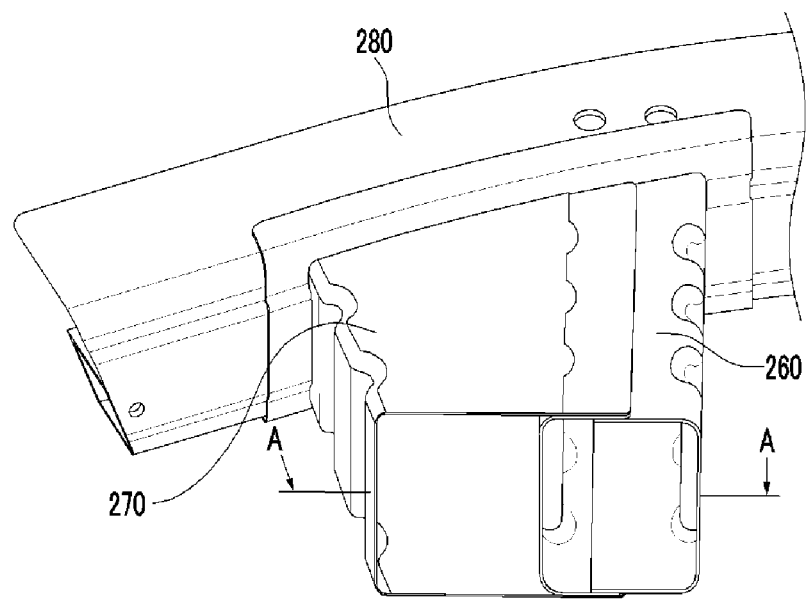
FIG. 7 is a perspective view illustrating a combined structure of first and second crash boxes in accordance with various exemplary embodiments of the present invention.
Figure 8:
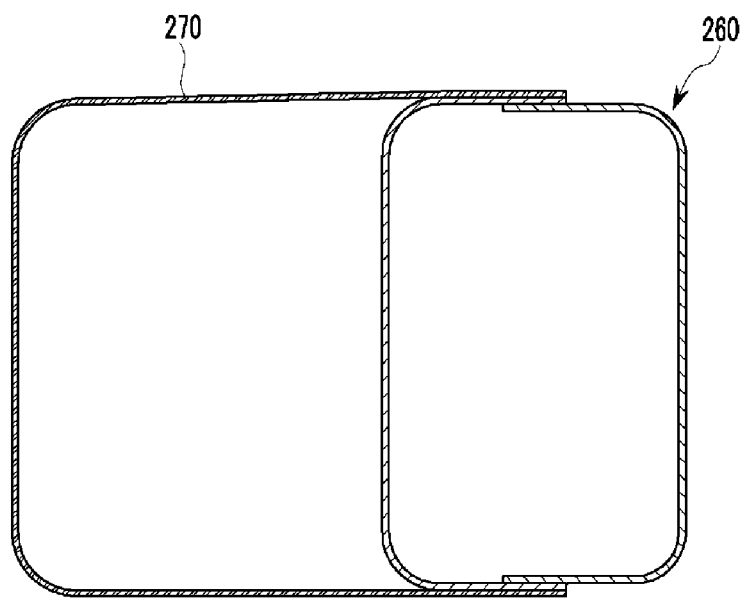
FIG. 8 is a cross-sectional view taken along a line A-A.

FIG. 6 is a diagram illustrating a vehicle bumper assembly according to a second exemplary embodiment of the present invention, FIG. 7 is a perspective view illustrating a combined structure of first and second crash boxes in accordance with a second exemplary embodiment of the present invention, and FIG. 8 is a cross-sectional view taken along a line A-A.

Referring to FIGS. 6 to 8, in accordance with a second exemplary embodiment of the present invention, a vehicle bumper assembly 200 includes a structure that can minimize collision energy delivered to the vehicle body and improve safety of passengers, in which when a front portion of the vehicle is collided in front and side directions, the collision energy caused by the collision is doubly distributed and absorbed to efficiently distribute or absorb the collision energy.

In addition, the vehicle bumper assembly 200 may include a structure in which the crash boxes are mounted in front and side directions from a front portion of the vehicle, respectively, the deformation of the side member of the vehicle body can be minimized and the durability of the vehicle body can be improved by distributing or absorbing the collision energy.

As shown in FIGS. 6 to 8, the vehicle bumper assembly 200 includes a first side member 210 forming an external side in each of both sides of a front of a vehicle body, a second side member 220 coupled to the external side of the first side member 210, a fender member 230 having one side coupled to the external side of the second side member 220, a member flange 240 connected to front ends of the first and second side members 210, 220, a mounting flange 250 coupled with the member flange 240, a first crash box 260 having a rear end connected to the mounting flange 250, a second crash box 270 having a rear end connected to the mounting flange 250, and a bumper beam 280 having both sides each coupled to front ends of the first and second crash boxes 260, 270.

The first side member 210, the second side member 220, the fender member 230, the member flange 240, the mounting flange 250, the first crash box 260, the second crash box 270, and the bumper beam 280 of the vehicle bumper assembly 200 according to the second exemplary embodiment of the present invention described above have the same shapes and features as those of the vehicle bumper assembly 100 according to the first exemplary embodiment of the present invention described above. Accordingly, the detailed description thereof will be omitted.

In the vehicle bumper assembly 200 according to the second exemplary embodiment of the present invention, the second crash box 270 is coupled to the external side of the first crash box 260.

The second crash box 270 is coupled in a form of surrounding the external side of the first crash box 260, and a cross-section of the second crash box 270 is formed with "U" shape.

Therefore, in accordance with the second exemplary embodiment of the present invention, the vehicle bumper assembly 200 has an effect of minimizing collision energy delivered to the vehicle body and improving the safety of passengers, in which when the front portion of the vehicle is collided in front and side directions, a collision energy caused by the collision is doubly distributed and absorbed to efficiently distribute or absorb the collision energy.

In addition, it has an effect in that the crash boxes 260 and 270 are mounted in front and side directions from a front portion of the vehicle, respectively, and thus, the deformation of the side member of the vehicle body can be minimized and the durability of the vehicle body can be improved by distributing or absorbing the collision energy.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A bumper assembly for vehicle, comprising:
a first side member disposed in each of both sides of a vehicle body in a longitudinal direction thereof;
a second side member of which a first end portion is coupled to an external surface of the first side member;
a fender member having one side coupled to an external side of the second side member;
a member flange connected to front ends of the first and second side members respectively;
a mounting flange coupled with the member flange;
a first crash box having a rear end connected to the mounting flange;

a second crash box having a rear end connected to the mounting flange; and a bumper beam having both distal sides, each of which is coupled to front ends of the first and second crash boxes;

wherein a second end portion of the second side member is coupled to the second crash box via the member flange and the mounting flange.

2. The bumper assembly of claim 1, wherein the first crash box and the second crash box are aligned with a predetermined angle therebetween.

3. The bumper assembly of claim 1, wherein the both distal sides of the bumper beam are bent with a radius of curvature.

4. The bumper assembly of claim 1, wherein the second side member is formed in a triangular shape of which a width increases as becoming close to the bumper beam.

5. The bumper assembly of claim 1, wherein the member flange includes:

a first mounting surface coupled with the front end of the first side member; and a second mounting surface formed to be bent from the first mounting surface to an external side of the vehicle body and coupled with the front end of the second side member.

6. The bumper assembly of claim 5, wherein the mounting flange includes:

a third mounting surface coupled with the rear end of the first crash box; and a fourth mounting surface formed to be bent to the external side of the vehicle body from the third mounting surface and coupled with the rear end of the second crash box, wherein the third mounting surface of the mounting flange is connected to the first mounting surface of the member flange, and wherein the fourth mounting surface of the mounting flange is connected to the second mounting surface of the member flange.

7. The bumper assembly of claim 1, wherein the mounting flange includes:

a third mounting surface coupled with the rear end of the first crash box; and a fourth mounting surface formed to be bent to the external side of the vehicle body from the third mounting surface and coupled with the rear end of the second crash box.

8. The bumper assembly of claim 1, wherein the member flange and the mounting flange are coupled by a bolting.

9. The bumper assembly of claim 1, wherein another side of the fender member is coupled with a dash panel of the vehicle body.

10. The bumper assembly of claim 1, wherein the second crash box is coupled to the external side of the first crash box.

11. The bumper assembly of claim 10, wherein the second crash box is coupled in a form of surrounding the external side of the first crash box.

12. The bumper assembly of claim 10, wherein the second crash box is formed with a "U" shaped cross-section.

* * * * *